United States Patent [19]
Altstatt

[11] Patent Number: 5,771,441
[45] Date of Patent: Jun. 23, 1998

[54] SMALL, BATTERY OPERATED RF TRANSMITTER FOR PORTABLE AUDIO DEVICES FOR USE WITH HEADPHONES WITH RF RECEIVER

[76] Inventor: John E. Altstatt, 27801 Baker La., Los Altos Hills, Calif. 94022-2524

[21] Appl. No.: 630,502

[22] Filed: Apr. 10, 1996

[51] Int. Cl.⁶ .................................................. H04B 1/034
[52] U.S. Cl. ............................ 455/66; 455/95; 455/129; 343/718; 343/720; 381/14; 381/25
[58] Field of Search ........................... 455/129, 66, 575, 455/91, 95, 100, 107, 269, 270, 280, 282, 286, 83, 525; 343/718, 720; 381/25, 74, 86, 88, 14; 331/158

[56] References Cited

U.S. PATENT DOCUMENTS

| | | | |
|---|---|---|---|
| 2,236,946 | 4/1941 | Knopp | 84/1.16 |
| 2,828,413 | 3/1958 | Bowers | 250/20 |
| 2,840,694 | 6/1958 | Morgan | 250/14 |
| 3,080,785 | 3/1963 | Evans | 84/1.16 |
| 3,085,460 | 4/1963 | Edwards | 84/1 |
| 3,087,117 | 4/1963 | Mitchell | 325/118 |
| 3,296,376 | 1/1967 | Palmer | 84/1 |
| 3,579,211 | 5/1971 | Larsen | 340/174.1 |
| 3,743,751 | 7/1973 | Ibanez | 84/1.16 |
| 3,781,451 | 12/1973 | Nolan | 84/1.16 |
| 3,825,666 | 7/1974 | Jaggers | 84/1.01 |
| 3,863,157 | 1/1975 | Quinlan et al. | 455/270 X |
| 3,901,118 | 8/1975 | Ford | 84/1.16 |
| 3,906,160 | 9/1975 | Nakamura et al. | 179/15 BT |
| 4,004,228 | 1/1977 | Mullett | 325/113 |
| 4,229,826 | 10/1980 | Wanzer | 455/83 |
| 4,335,930 | 6/1982 | Feldman | 339/183 |
| 4,344,184 | 8/1982 | Edwards | 465/95 |
| 4,369,521 | 1/1983 | Sawada | 455/270 |
| 4,430,757 | 2/1984 | Szakvary | 455/90 |
| 4,453,269 | 6/1984 | Skar | 455/129 |
| 4,464,792 | 8/1984 | Owerko | 455/128 |
| 4,471,493 | 9/1984 | Schober | 455/90 |
| 4,612,688 | 9/1986 | Sarac | 455/120 |
| 4,647,135 | 3/1987 | Reinhardt | 339/103 R |
| 4,721,926 | 1/1988 | Aota | 332/16 T |
| 4,794,622 | 12/1988 | Isaacman et al. | 375/71 |
| 4,845,751 | 7/1989 | Schwab | 381/25 |
| 4,899,388 | 2/1990 | Mlodzikowski et al. | 381/77 |
| 4,988,957 | 1/1991 | Thompson et al. | 331/158 X |
| 5,025,704 | 6/1991 | Davis | 84/723 |
| 5,214,568 | 5/1993 | Heng | 361/395 |

*Primary Examiner*—Edward F. Urban
*Assistant Examiner*—Philip J. Sobutka
*Attorney, Agent, or Firm*—Ron Fish Falk & Fish LLP

[57] ABSTRACT

A portable RF transmitter having an audio plug extending therefrom which mates with the earphone or output jack of an audio source such as a portable battery operated CD or tape player and having no external antenna. The portable RF transmitter modulates audio signals from the audio source onto an FM carrier and transmits them to an FM receiver mounted on a headset worn by a user. The RF transmitter uses its own ground circuit and the ground circuit of the audio source as two elements of a short dipole. The two ground circuits are electrically isolated at RF by an RF choke but connected together at audio frequencies by the low impedance of the choke at audio. The choke's leakage inductance also reduces the capacitive reactance of the dipole antenna for better power dissipation. A transformer coupling the RF output to the dipole transforms the impedance of the dipole to a value closer to the output impedance of the RF transmitter.

19 Claims, 4 Drawing Sheets

SMALL, BATTERY OPERATED RF TRANSMITTER FOR PORTABLE AUDIO DEVICES FOR USE WITH HEADPHONES WITH RF RECEIVER

BACKGROUND OF THE INVENTION

The invention pertains to the field of portable audio equipment.

1. Technical Field

With the widespread use of portable AM/FM receivers, portable AM/FM/Cassette players or cassette players standing alone and the rising popularity of portable CD players, a need has arisen for a good way of getting the audio signals to the user's ears. Currently, users wear headphones which are coupled to the portable audio device by wires. These wires are inconvenient and possibly dangerous. Typically, users wear such portable audio devices while they are doing other things such as working out, rollerblading, doing manual labor, driving, cleaning the house etc. During such activities there is frequently a great deal of arm motion and sometimes there are moving or stationary objects which are or pass within close range of the users upper torso. The wires connecting headphones to the portable audio device usually swing freely in the space around the users upper torso since the typical place users place the portable audio device is along their waistline on a belt or in a special carrying case. As a result of the wires swinging freely in the space around the users upper torso between the users waist and the headphones, the wires frequently get tangled up with the users arms, or snag on some stationary or, worse, some moving object near the users upper torso. This can be not only destructive to the portable audio equipment and headphones but dangerous as well. Further, having the headphone yanked from your head and possibly sending eyeglasses flying with them can be embarrassing.

Therefore, a need has arisen for a device which can attach to a portable audio device and which can transmit audio signals from the portable audio device to the headphones without wires but which is small enough to be unobtrusive.

2. Background Art

Wireless FM transmitters from audio equipment to headphones with FM receivers therein are known. For example, Recotan makes a line of AC powered FM transmitters that receive audio signals from a stereo receiver, cassette player, CD player or DAT tape drive unit. These audio signals are modulated onto an RF carrier which is transmitted. The user wears headphones with receivers therein and can be anywhere within about 500 feet. The problem with this unit is that it must be plugged into a source of AC power and it is too large to use with a portable audio device. The Recotan units have external antennas which have disk-like shapes not unlike the radomes on E-3 AWACS airborne radar planes. Since there is no source of AC power on a portable audio device and since there is no room for such a large antenna structure, the Recotan units represent an unacceptable solution for a portable audio device.

Small RF transmitters have been used on electric guitars to transmit audio signals from the guitar transducer to a receiver coupled to a power amplifier. An example of this type of technology is found in U.S. Pat. No. 5,025,704 to Davis. In Davis, a small transmitter built into a plastic housing which has a phone plug projecting therefrom is plugged into a female phone jack on a guitar. The female phone plug is coupled to a transducer in the guitar which senses the vibrations of the strings and converts them to audio signals. The audio signals are modulated onto an RF carrier and the carrier is coupled to a coil of wire 50 which acts as an antenna. The coil of wire is wrapped around the circuit board inside the housing. The Davis patent also teaches that the metallic strings of the guitar are also coupled to signal ground of the transmitter and that the coil of wire 50 induces RF radiation between the coil of wire 50 and the strings of the guitar.

Other examples of RF transmitters for stringed instruments include U.S. Pat. No. 3,080,785 [Battery powered RF transmitter that modifies transducer acoustic signal from string vibrations to enhance aesthetic effect]; U.S. Pat. No. 3,085,460 [Battery powered tunnel diode RF transmitter coupled to transducer system of electric guitar—external rod antenna projecting from top of guitar near performer's fret arm]; U.S. Pat. No. 3,743,751 [Drum sound effect unit small enough to fit inside electric guitar with signal from drum sound effect unit and transducer pickup for string vibrations summed and modulated onto RF carrier and transmitted via external antenna 90]; U.S. Pat. Nos. 3,825,666 and 3,901,118 [RF transmitter coupled to electric guitar]; U.S. Pat. No. 4,004,228 [portable transmitter with antenna conductor printed on printed circuit board with central area of printed circuit board with operative components carrying as much excess metal as possible so as to capacitively load the antenna and reduce the effect of any external conductors adjacent to the antenna and capacitively loading it and changing its impedance].

U.S. Pat. No. 4,344,184 teaches a wireless microphone not requiring external antenna. The microphone has a tubular housing is made of nonconductive material. A microphone projects from one end of the housing. The housing also contains an audio amplifier and a RF transmitter. The amplifier and transmitter are physically separated from each other, but are interconnected by RF chokes. The output of the transmitter is coupled to circuit ground of the audio amplifier such that the microphone and first circuit serve as one radiator of a dipole and the battery and second circuit serve as the other radiator of the dipole. U.S. Pat. No. 4,471,493 teaches a portable extension phone having an RF transmitter and an RF receiver therein, neither of which uses a whip antenna. The extension phone instead has a separate conductive plate which is part of a pivoting part of the phone which helps reflect sound from a user's lips toward a built in microphone. The conductive plate also serves as one element of a dipole. The other element of the dipole is a conductive static shield which also serves to protect elements on a printed circuit board inside the extension phone.

U.S. Pat. No. 4,430,757 teaches a portable RF ELT transmitter which is contained within a housing which is hung around the user's neck by a chain which forms a quarter wavelength antenna.

Other portable RF transmitters of interest include the transmitter taught in U.S. Pat. No. 2,840,694 to Morgan. This transmitter is basically a microphone that uses the microphone as the antenna. U.S. Pat. No. 4,794 622 teaches a low power, hand held RF transmitter which uses a surface acoustic wave resonator to stabilize the frequency of the RF oscillator to within 0.05% of the center frequency of the SAW resonator for the condition where the user's hand is enclosing the transmitter. The stability of the RF transmitter frequency allows the receiver to use an extremely narrow bandwidth thereby cutting down on the amount of extraneous signals received by the receiver. U.S. Pat. No. 4,612,668 teaches a battery operated transmitter coupled to an audio input device by a cable. This transmitter uses a printed circuit loop conductor on the printed circuit of the transmitter both as a tank circuit inductance and capacitance which determines the frequency of operation as well as the antenna. Another conductive plate formed on the undersurface of the protective case that houses the transmitter so as to be in close proximity to the loop conductor inductor serves as the opposing plate of the tank circuit capacitor, the first plate of which is the loop conductor inductor. By setting the dimensions of this plate, the capacitance can be altered thereby changing the transmitter frequency.

A wireless headphone system is taught in U.S. Pat. No. 4,845,751. In this system, a headphone unit has both a transmitter and a receiver therein. A radio or other stereo unit has a transmitter/receiver plugged into an audio output jack. The audio output of the stereo unit is transmitted as two separate stereo channels to the headphone unit where the headphone receiver receives the signal and feeds each channel to one of the earpieces of the headset. The transmitter in the headphones encodes signals from seek and scan buttons on the headset and transmits these signals to the receiver of the transmitter/receiver unit plugged into the audio output jack. There, the signals are decoded and coupled to electronically controlled seek and scan controls for the stereo receiver. No indication is given in this patent as to whether the transmitter plugged into the stereo receiver is battery operated. The transmitters of the unit plugged into the audio output jack of the stereo receiver feed a wire antenna 38.

U.S. Pat. No. 2,828,413 teaches a portable radio receiver which is encapsulated in a conductive container which is divided into two halves which are separated by a dielectric. The two conductive halves of the container form a dipole antenna the halves of which are coupled to the two terminals of the primary winding of a transformer which has its secondary winding coupled to the RF input of the receiver.

DISCLOSURE OF THE INVENTION

According to principles of the present invention, there is provided a portable, battery operated transmitter integrally formed with an audio input plug which mates with an earphone or output jack on an audio source and which uses its own ground trace and that of the audio source as a short dipole antenna thereby eliminating the need for an external antenna. The transmitter modulates the audio signal from the audio source onto an RF carrier and transmits it to a headphone receiver worn by a user who is also usually wearing or carrying the audio source. One aspect of the present invention is the use of some means such as an RF choke to simultaneously electrically isolate the two ground traces at RF frequencies but to couple them by a low impedance path at audio frequencies, and to utilize the leakage inductance of the RF choke to neutralize or partially offset the capacitive reactance of the short dipole antenna thereby transforming its impedance into a principally real axis impedance. Another aspect of the present invention is the use of a transformer or tank circuit coupled to the RF output of the transmitter and the short dipole antenna to step down the impedance of the short dipole to an impedance that more closely matches the output impedance of the RF amplifier so as to increase power transfer to the antenna. There are several alternative embodiments, some of which are described below. One preferred embodiment uses a headphone receiver which has two cascaded piezoelectric resonators in the IF section to increase the selectivity of the receiver and aid in rejecting interfering signals from adjacent frequencies to the transmitter frequency.

DETAILED DESCRIPTION OF THE PREFERRED EMBODIMENT

Figures 1, 2:
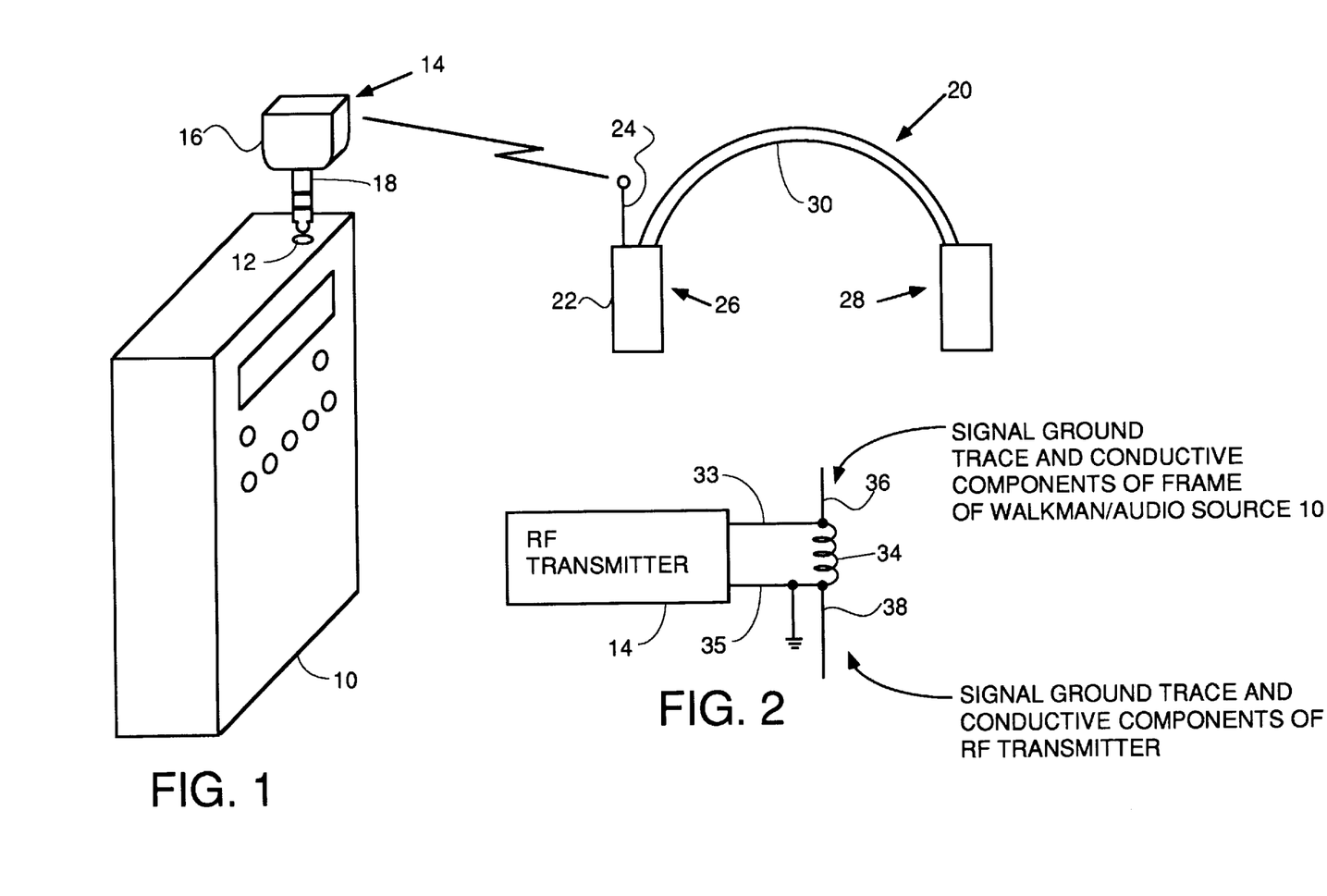
FIG. 1 is a perspective view of a system utilizing the teachings of the invention.
FIG. 2 is a schematic diagram illustrating the use of an RF choke to electrically isolate the audio source ground circuit from the transmitter ground circuit at RF so as to implement a short dipole antenna using these ground circuits.

Referring to FIG. 1, there is shown a diagram of a system within the genus of the invention. A battery operated audio source 10, typically a portable stereo radio, a portable cassette player or a portable compact disk player, generates audio signals from received radio signals or program material recorded on a medium. These audio signals are presented at a headphone or output jack 12.

A portable, battery operated RF transmitter 14, comprised of a transmitter housing 16 and enclosed integrated circuitry and a male plug 18, which plugs into the headphone or output jack 12. The audio signals generated by the audio source 10 are amplified and modulate an RF carrier. The RF carrier is coupled into an antenna for radiation to a headphone receiver 20. The antenna for the RF transmitter 14 is comprised of the ground circuit of the RF transmitter as one half of a dipole and the ground circuit and other conductive components of the housing of the portable audio source 10 as the other half of a dipole. A dipole antenna as used herein includes any antenna having two radiating elements.

The headphone set 20 has a built in radio receiver 22 with a small rod antenna 24. The radio receiver 22 has an audio output which is coupled to two earphone pieces 26 and 28 which are held adjacent a wearer's ears by frame 30. The advantage of the above described system is that there are no wires that couple the audio source to the headphones. This prevents the user from possibly snagging the wires on his or her arms during exercise or physical work and prevents the user from catching the wires on weightlifting equipment in use by the user or items the user is walking by. Catching the wires can not only damage the audio source and headphones by causing them to be dragged from the user's body and dropped from a distance onto a hard floor, but also presents a potential safety hazard. Note that there is no external antenna whip or rod on RF transmitter 14. This is a handy feature since the audio source is often worn on the user's beltline, so a whip antenna sticking up further than the transmitter 14 itself could poke the user in the side and would be susceptible to bending or breakage by active users who are moving around.

FIG. 2 illustrates a schematic diagram of the antenna arrangement used in the preferred embodiment. The circuitry of the RF transmitter audio amplifiers, RF oscillators and modulators is represented by block 14. The modulated RF carrier is output on lines 33 and 35 from the RF transmitter. Lines 33 and 35 are coupled to an RF choke 34, which, at audio signal frequencies is a low impedance path, but at the RF frequency of the carrier output by the RF transmitter appears as a high impedance. Line 33 is coupled to a conductive dipole element 36 which is comprised of the signal ground trace and any conductive components of the audio source 10 which are coupled to signal ground. Line 35 is coupled to a conductive element 38 which is the other half of a dipole and which comprises the signal ground trace and conductive components of the RF transmitter 14. The RF choke 34 allows the signal ground of the audio source 10 to be coupled by a low impedance path to the signal ground of the RF transmitter 14 at audio frequencies. However, since the RF choke 34 acts as a high impedance at the carrier frequency, the dipole elements 36 and 38 are virtually electrically isolated from each other at the carrier frequency. This means that the alternating voltages on lines 33 and 35 which are oscillating at the carrier frequency drive the dipole elements with alternating voltages at the RF frequency and are not shorted by the RF choke 34. The RF choke 34 provides the advantage allowing the signal ground traces of the audio source and the RF transmitter to be coupled by a low impedance path so that the circuitry in each unit has a common reference voltage and to eliminate any possible ground loops.

Figure 3:
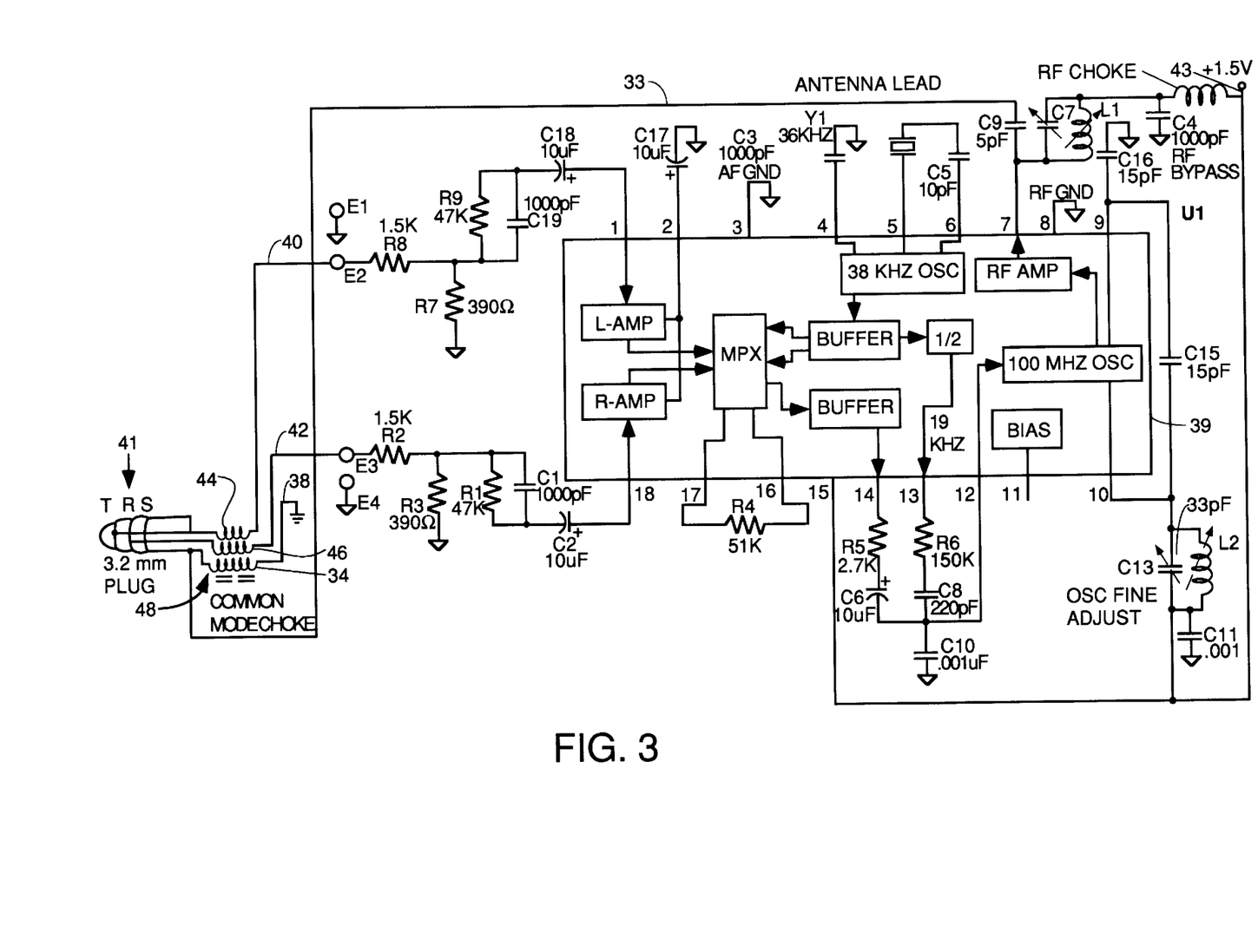
FIG. 3 is a detailed schematic diagram of the transmitter circuit of one embodiment.

Referring to FIG. 3, there is shown a detailed schematic diagram of one embodiment of the RF transmitter 14 which shows details of one embodiment for an antenna impedance matching arrangement. The RF transmitter 14 includes a commercially available stereo FM transmitter integrated circuit 39 manufactured by Rohm under Model Designation BA1404. The transmitter contains a stereo modulator which modulates the RF output signal using as input the audio signals on lines 40 and 42 received from the audio source 10. These audio signals enter the transmitter through two coils 44 and 46 of a three coil common mode RF choke 48. These coils 44 and 46 couple audio signal input lines 40 and 42 to the tip and ring lines of a 3.3 millimeter stereo audio plug 41 which plugs into the earphone or output jack 12 on the audio source 10. The audio signals have an amplitude controlled by the volume control on the audio source. This amplitude controls the amount of frequency deviation of the transmitter, so some precautions must be taken to limit the amount of deviation. Resistors R8 and R7 along with a preemphasis circuit comprised of resistor R9 and capacitor C19 control the ratio of audio output voltage to resulting FM frequency deviation such that the deviation does not exceed the standard 75 kHz deviation used by FM broadcast receivers and so as to not deviate the carrier frequency outside the passband of the receiver 22 thereby degrading reception. Resistor R2 and R3 combined with preemphasis circuit R1 and C1 provide the same protection for the other stereo channel. The preemphasis circuits matches the deemphasis circuit in the receiver which is present to improve signal to noise ratio. The preemphasis circuits are coupled to the transmitter by DC blocking capacitors C17 and C2.

The audio inputs are coupled through these blocking capacitors to left and right amplifiers and are then coupled to an stereo multiplexer. The purpose of this FM multiplexer is to provide FM stereo multiplexing for stereo decoding in the receiver. The FM stereo multiplexer encodes the incoming audio left and right channels by summing the left and right channels to generate a first signal. The summing is performed at the junction of capacitors C6, C8 and C10. The left and right channels are differenced to generate a second signal. The second signal modulates the 38 kHz signal to generate a third signal. The 38 kHz signal is also divided by two to generate a 4th signal, which is used as a pilot signal. The fourth signal, first signal and third signal are then summed to generate a encoded output signal, which is then used to FM modulate a carrier frequency. This encoded output signal is comprised of three portions. The region which is from 50 Hertz to 15 kHz, is comprised of the left plus right channels. The second portion is the pilot signal at 19 kHz, and the third is the region from 23 to 53 kHz which comprises the left minus right channels.

The RF choke 48 has a third coil 34 which shares the same magnetically permeable core as coils 44 and 46. Coil 34 couples the shield terminal of audio plug 41 to signal ground 38 of the RF transmitter. Signal ground 38 of the RF transmitter acts as one conductor of the antenna dipole. The other conductor 38 of the antenna dipole is the ground trace of the audio source which is coupled to the shield terminal of the audio plug 41 by a shield terminal on the earphone or output jack of the audio source. The shield terminal of the audio plug 41 is also coupled by line 33 to the RF output of the RF amplifier of the transmitter which is driven by pin 7. Pin 7 is separated from line 50 by a DC blocking capacitor C9. Line 33 is also coupled to an impedance matching circuit comprised of the tank circuit comprised of capacitor fixed capacitor C7 and fixed inductor L1. The function of this tank circuit is to attempt to match the output impedance of the RF transmitter with the input impedance of the antenna structure comprised of the two ground traces of the RF transmitter and the audio source. Because the impedance of the antenna structure depends upon the size and the physical configuration of the conductive ground traces and chassis structures of the audio source and RF transmitter, the impedance of the antenna structure will vary from one audio source to another. Therefore, the values of C7 and L1 are, in one embodiment, selected to make the best impedance match for most impedances which will be encountered in practice. Since the needed range for the transmitter to the headphone receiver is typically 30 only 3 feet or so, an exact impedance match is not required as in long range receivers but it is important to achieve as much power transfer as possible from the transmitter to the antenna for best reception. In alternative embodiments, either or both of capacitor C9 and inductor L1 are tunable such that the user can alter the inductance or capacitance or both while listening to the signal to set these values at settings which give the best reception. These embodiments are represented by the dashed arrows through C7 and L1. The tank circuit couples pin 7 to the positive voltage supply Vcc at 43. A bypass capacitor C4 bypasses any RF energy to signal ground to keep it out of the battery. Terminal 43 is coupled to a 1.5 volt battery.

The coil 34 of the RF choke provides a low impedance path at audio frequencies between the signal ground of the RF transmitter and the signal ground of the audio source. However, at the 88–108 MHz output frequency of the RF carrier from the transmitter, coil 34 is a high impedance thereby electrically isolating the two ground traces such that they can operate as the two electrically isolated elements of a short dipole antenna so as to radiate the RF energy generated by the transmitter to the headphone receiver.

In the preferred embodiment, the center frequency of the RF carrier generated by the transmitter is set by the fixed values of capacitor C13 and inductor L2 forming a tank circuit which controls the frequency of the RF oscillator in the transmitter. In the preferred embodiment, the frequency is set before shipment by bending the inductor L2 to change its inductance. In alternative embodiments, either the capacitance of capacitor C13 or the inductance of inductor L2 may be varied, or both may be varied by the user in the field to set the frequency of transmission of the transmitter. This allows the user to move the frequency of his or her transmitter in case a strong local station is causing interference. These embodiments are represented by the dashed arrows through capacitor C13 and inductor L2. In an alternative embodiment, the tank circuit comprised of L2 and C13 can be replaced by a piezoelectric resonator (crystal oscillator).

Pin 8 of the transmitter is coupled to the ground trace 38 of the RF transmitter, so pin 8 represents conductor 35 in FIG. 2.

Figure 4:
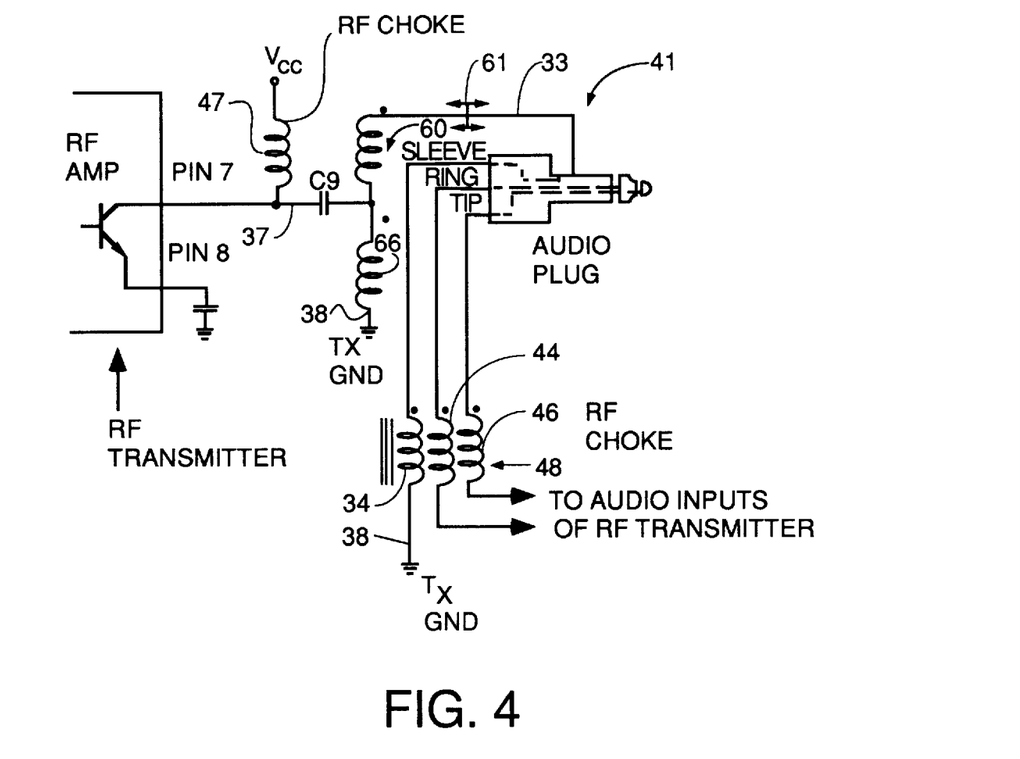
FIG. 4 is a schematic diagram showing another embodiment of an output circuit using an RF choke for neutralizing the capacitive reactance of the antenna and using an autotransformer to step the antenna impedance down closer to the output impedance of the RF amplifier of the transmitter.

FIG. 4 represents an alternative embodiment for an output impedance matching structure. In this structure, pin 7 of the transmitter is coupled through a DC blocking capacitor 58 to the center tap a broadband impedance matching transformer 60. The transformer 60 is a one to one transformer with the primary portion of the winding coupling pin 7 to the transmitter signal ground 38. The other half of this single winding in transformer 60 acts as the secondary winding. The RF carrier signals on line 37 pass through DC blocking capacitor C9 and coupled to the transmitter signal ground through the bottom half of the transformer 60 winding thereby setting up an oscillating magnetic field which is coupled to the top half of the winding. This induces an EMF voltage in the top half of the winding which is coupled by line 33 to the sleeve of the audio plug 41. This sleeve is coupled through the earphone or output jack sleeve terminal to the signal ground trace of the audio source to act as one half of the dipole antenna. The other half of the dipole antenna is the transmitter signal ground conductive trace on the RF transmitter printed circuit board represented by the ground connections at 38. RF choke coils 44 and 46 couple the tip and ring terminals of the audio jack to the audio input ports of the transmitter (not shown). Vcc voltage is coupled to pin 7 through an RF choke 47. The signal ground trace of the RF transmitter is electrically isolated at RF frequencies from the signal ground trace of the audio source by the third coil 34 of the RF choke. The three coils of the RF choke 48 are made by winding trifilar wire around a single core. The RF choke functions not only to isolate the two ground traces at RF frequency but also the RF choke leakage inductance helps tune out some of the capacitive reactive impedance of the short antenna structure as seen from wire 33 looking into the antenna structure at point 61.

Figure 5:
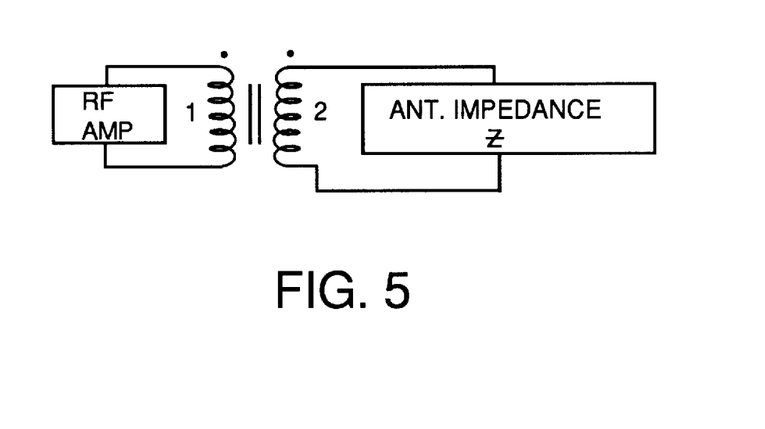
FIG. 5 is a schematic diagram illustrating how the autotransformer steps the antenna impedance down.

Because the transmitter is very low power, it is important to maximize the power transfer from the transmitter to the antenna structure. Maximum power transfer occurs when the impedance at point 61 looking into the antenna structure is the complex conjugate of the impedance looking back from point 61 into pin 7 (the output stage of the RF amplifier). To help do this, the RF choke 48 and the transformer 60 are used. The antenna impedance of the two ground traces is a complex impedance with a real component and a capacitive reactive component because of the shortness of the antenna. Short antennas are defined as antennas whose dimensions are much smaller than the wavelength. At 100 MHz, the wavelength is 3 meters, so the physical dimensions of the antenna structure described herein qualify it as a short antenna. In the treatise, Schelkunoff and Friis, *Antennas: Theory and Practice*, (Wiley & Sons New York) 1952, the entirety of which is hereby incorporated by reference, it is stated at Section 1.7, page 18 that short antennas are primarily capacitors. By addition of the RF choke, the leakage inductance coupled to the sleeve of the audio plug substantially cancels the capacitive reactance of the antenna structure thereby rendering its impedance on the real or purely resistive axis. Because the impedance of the output stage of the RF amplifier is substantially lower than the antenna impedance, it is preferable to use step down transformer 60 to make the antenna impedance look lower at the RF amplifier output at pin 7. Step down transformer 60 does this. Each of the upper and lower coils is 10turns, but the number of turns from the antenna terminal, i.e., point 60 to signal ground is 20 turns. The RF amplifier output at pin 7 sees only 10 turns from the center tap to ground. Therefore, the equivalent circuit is as shown in FIG. 5. Because the impedance of the antenna reflected through the transformer decreases as the square of the turns ratio, at the output of the RF amplifier, the antenna impedance is smaller by a factor of 4 because of the 2 to 1 turns ratio. This improves the power transfer from the RF amplifier to the antenna. Power transferred to the antenna is $V^2/R$ where R is the load impedance of the RF amplifier, i.e., the impedance looking into the antenna at the output of the RF amplifier, and V is the RMS amplitude of the RF carrier swings. The maximum value of V is fixed by the battery voltage of 1.5 or possibly 3 volts. Therefore, the only thing that can be done to increase the power dissipated in the antenna is to lower its apparent load impedance at the output of the RF amplifier. The transformer 60 does this by lowering the antenna impedance by a factor of 4. The fact that the RF choke makes the antenna impedance look primarily resistive helps in power dissipation also by eliminating the reactive component.

Figure 6:
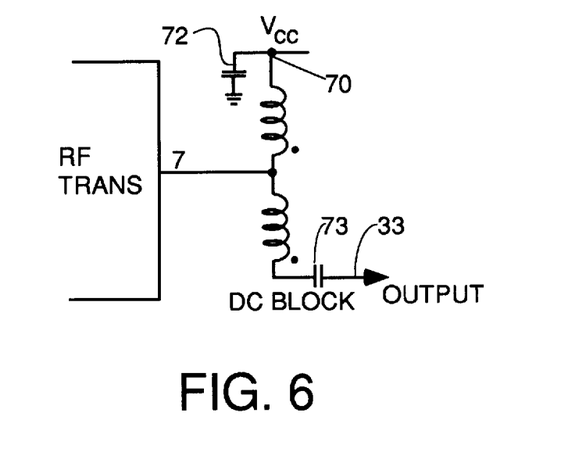
FIG. 6 is a schematic diagram of the preferred arrangement to step the antenna impedance down and supply Vcc voltage to the RF amplifier.
Figure 7:
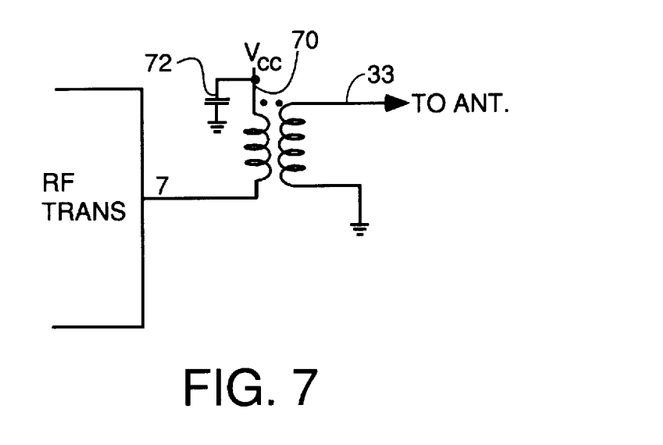
FIG. 7 is a schematic diagram of an alternative arrangement to step the antenna impedance down and supply Vcc voltage to the RF amplifier.

One alternative arrangement of supplying DC voltage to pin 7 is to connect the bottom of the primary winding 66 to the Vcc supply and putting a blocking capacitor at point 61. FIGS. 6 and 7 represent other embodiments for methods of coupling Vcc power to pin 7. FIG. 6 is the preferred embodiment. Vcc is coupled to point 70 which is coupled to ground at RF frequencies by capacitor 72 which makes point 70 RF signal ground 38 for the transmitter. A DC blocking capacitor 73 isolates the battery Vcc supply from the antenna lead 33 and from signal ground of the audio source. This eliminates the need for an RF choke such as choke 47 in FIG. 4 thereby making it easier to shrink the size of the RF transmitter package. FIG. 7 represents an alternative output arrangement which uses a transformer with electrically isolated primary and secondary windings. This provides DC isolation from the Vcc input at point 70 to the antenna output lead 33 thereby eliminating the need for blocking capacitor 72. Again, point 70 is RF signal ground 38 for the transmitter by virtue of point 70 being coupled to the ground trace by RF bypass/DC blocking capacitor 72.

Figure 8:
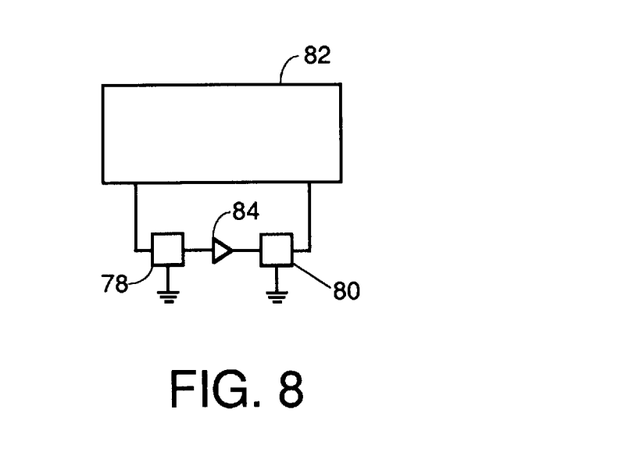
FIG. 8 is a diagram of the preferred receiver arrangement showing the use of two cascaded piezoelectric resonators in the IF section to increase receiver selectivity.

Referring to FIG. 8, there is shown a block diagram of an improvement in the headphone receiver that improves the selectivity thereof for better rejection of interfering signals from adjacent frequencies. The headphone receiver 22 is typically a General Electric GE 7-1295 type superhetrodyne FM receiver which is comprised of two receiver chips having model numbers TA7792F and 7766AF and is manufactured by Thomson Consumer Electronics, Inc. in Indianapolis. Typically such receiver chips utilize single, external IF filters in the form of piezoelectric resonators. These resonators have passbands centered around the IF frequency, but their skirt slopes are not sufficiently steep to provide adequate selectivity for best performance. To increase the steepness of these skirts in the transfer function passband of the overall receiver, two piezoelectric resonators are ganged to at least double the steepness of the skirts outside the 3 db points. Those two piezoelectric resonators are shown at 78 and 80. Because these piezoelectric resonators impose losses of 7–8 db, an amplifier 84 that provides 7–8 db of gain is used so that sufficient drive to the discriminator circuit within receiver chip 82 to allow adequate reception. The maximum deviation of the FM carrier from transmitter 14 is approximately 75 kHz. The Carson rule on bandwidth requires that the overall transfer function of the FM receiver be two times the deviation plus the highest audio frequency that will be encountered in the transmitter input. This rule requires that the overall transfer function of the receiver 22 be approximately net 180–200 kHz. Because ganging the piezoelectric resonators narrows the bandwidth between the 3 db points in the resulting composite transfer function, resonators should be chosen which have slighter wider bandwidths than the desired net bandwidth of the overall receiver. Thus, resonators 78 and 80 should be selected to have 3 db bandwidths of approximately 230 kHz. Such piezoelectric resonators are commercially available from Toko under model designations SK107M2A0-00.

Although the invention has been described in terms of the preferred and alternative embodiments disclosed herein, those skilled in the art will appreciate that various other alternative arrangements can be made. All such alternative embodiments which do not depart from the spirit and scope of the invention are intended to be included within the scope of the claims appended hereto.

What is claimed is:

1. An apparatus, comprising:

any audio source having an audio output jack and having a signal ground conductor coupled to a first terminal of said audio output jack, said audio source having right and left stereo audio channels which output left and right channel signals and which are coupled to second and third terminals of said audio output jack;

an RF stereo transmitter positioned within a housing made of any material and having left and right audio inputs and a ground conductor all of which are electrically coupled to an audio plug sized to mate with said audio output jack of said audio source and having first, second and third terminals which electrically connect to said first, second and third terminals, respectively, of said output jack when said audio plug is inserted into said audio output jack, said RF transmitter having a signal ground conductor coupled via a first coil of a three coil common mode radio frequency choke to said signal ground conductor of said audio source through said first terminals of said audio output jack and said audio plug when said audio output jack and audio plug are mated, said first coil of said three coil common mode radio frequency choke having a high impedance at the frequency of transmission of said RF stereo transmitter but small enough impedance at audio frequencies to render said signal ground conductors of said RF transmitter and said audio source essentially one conductor at audio frequencies, and wherein the three coil common mode choke includes second and third coils which are wound around the same core of magnetically permeable material as said first coil and have exactly the same impedance as said first coil, and wherein said left and right channel signals from said audio source are coupled to left and right channel audio inputs of said RF stereo transmitter through said second and third coils of said common mode RF choke, said RF stereo transmitter having an RF output comprising an RF ground output terminal coupled to said signal ground conductor of said RF stereo transmitter and an RF output terminal coupled to said first terminal of said audio plug so as to be connected to said signal ground conductor of said audio source when said output jack and audio plug are mated but so as to be electrically isolated at the frequency of said RF stereo transmitter from the signal ground conductor of said RF stereo transmitter by said first coil of said three coil common mode radio frequency choke, whereby said signal ground conductor of said RF transmitter and said signal ground conductor of said audio source act as dipole antenna elements of a radiating antenna.

2. The apparatus of claim 1 wherein said audio source is any portable audio source such as a radio, cassette player, CD player or other device, and further comprising an impedance matching network comprised of a fixed capacitor and fixed inductor and connected so as to couple said RF transmitter to a dipole antenna comprised of the ground conductors of said audio source and said RF stereo transmitter, each of said fixed capacitor and fixed inductor having values selected to provide the best impedance match between the output impedance of said RF transmitter and the average input impedance of said dipole antenna.

3. The apparatus of claim 1 wherein said RF transmitter has its transmit frequency tuned so as to be in the FM radio band at a position to not interfere with local stations, and further comprising a portable headphone FM receiver for receiving signals from said RF transmitter, said receiver having an IF filter comprised of two piezoelectric resonators substituted for the normal IF filter of said receiver and coupled together so as to at least double the steepness of the skirts of the passband of the IF filter of a normal FM receiver with only a single piezoelectric resonator in the IF filter so as to improve the selectivity of said receiver, and further comprising an amplifier coupled to said piezoelectric resonators to amplify signals passing therethrough to add gain sufficient to make up part or all of the loss imposed by said second piezoelectric resonator, said two piezoelectric resonators selected to have 3 dB bandwidths that are wider than the 3 dB bandwidth of the IF resonator that was replaced by them such that the 3 dB point bandwidth of the composite transfer function of the two piezoelectric IF resonators satisfies Carson's rule for this particular receiver.

4. A system comprising:

an audio source for supplying stereo audio signals having left and right channels at an output jack, said output jack having at least firsts, second and third terminals, said audio source having a signal ground conductor coupled to said first terminal, said left and right channel audio signals coupled to said second and third terminals, respectively;

a stereo RF transmitter having an RF output at which said RF transmitter supplies as an output signal a modulated RF stereo signal and having an audio plug sized to mate with said output jack, said RF transmitter having a signal ground conductor and having left and right channel inputs coupled to said second and third terminals of said audio plug, respectively, by first and second coils of a three coil common mode RF choke having first, second and third coils wound on the same magnetically permeable core so as to have identical high impedances at the frequency of said transmitter and identical low impedances at audio frequencies, said audio plug having a first second and third terminals which make electrical contact with said first second and third terminals, respectively, of said output jack when said audio plug is mated with said output jack, said first terminal of said audio plug coupled to said RF output through said first coil of said three coil common mode RF choke;

an antenna comprising said signal ground conductor of said audio source as one element of said antenna and said signal ground conductor of said RF transmitter as another element of said antenna, said antenna having a complex impedance which has a real component and an imaginary component;

and wherein said first coil of said common mode RF choke functions to electrically isolate the signal ground conductors of said RF transmitter and said audio source at the frequency of said RF carrier but electrically couple said signal ground conductors of said RF transmitter and said audio source via a low impedance path at audio frequencies, said first coil of said common mode RF choke also serving to cancel at least part of said reactive component of said antenna impedance so as to transform the impedance of said dipole antenna to an impedance closer to a purely real impedance with a smaller reactive component;

and further comprising means coupled to said RF output for transforming said impedance of said antenna, as modified by said first coil of said RF choke, to an impedance which is a closer match to the complex conjugate of the output impedance of said RF transmitter at said RF output.

5. A system for use with an audio source which supplies stereo left and right channel audio signals at an output jack, said output jack having first, second and third terminals, said audio source having a signal ground conductor coupled to said first terminal, said audio signals coupled to said second and third terminals, respectively, comprising:

an RF transmitter having an RF output at which said RF transmitter supplies as an output a modulated RF stereo signal and having an audio plug sized to mate with said output jack, said RF transmitter having a signal ground conductor and having an audio input comprising left and right audio channel inputs, said audio plug having a first terminal which makes electrical contact with said first terminal of said output jack when said audio plug is mated with said output jack, said first terminal of said audio plug coupled to said RF output via a first coil of a three coil common mode RF choke, said audio plug having second and third terminals coupled to the left and right channel inputs of said audio input via second and third coils of said RF choke, and said second and third terminals of said audio plug making electrical contact with said second and third terminals of said output jack when said output jack and said audio plug are mated;

a dipole antenna comprising said signal ground conductor of said audio source as one element of said dipole and said signal ground conductor of said RF transmitter as another element of said dipole antenna, said dipole antenna having a complex impedance which has a real component and an imaginary component;

and wherein said first coil of said RF choke coupled between said first terminal of said audio plug of said RF transmitter and said signal ground conductor of said RF transmitter functions to electrically isolate the signal ground conductors of said RF transmitter and said audio source from each other at the frequency of said RF carrier but to electrically couple said signal ground conductors of said RF transmitter and said audio source via a low impedance path at audio frequencies, and and also serves to cancel at least part of said reactive component of said complex impedance of said dipole so as to transform the impedance of said dipole antenna to an impedance closer to a purely real impedance with a smaller reactive component;

and further comprising impedance transformation means coupled to said RF output for transforming said impedance of said dipole antenna, as modified by said first coil of said RF choke, to an impedance which is a closer match to the complex conjugate of the output impedance of said RF transmitter at said RF output.

6. The system of claim 5 further comprising a receiver mounted on a headphone, said receiver tuned to the frequency of said RF transmitter, said receiver having an IF section comprised of two cascaded piezoelectric resonators or other IF filters and an amplifier coupled to amplify the signal passing through said piezoelectric resonators or other IF filters to make up for at least some of the loss caused by the addition of a second piezoelectric resonator, the use of two cascaded piezoelectric resonators increasing the selectivity of said receiver.

7. The system of claim 6 wherein each of said piezoelectric resonators or other IF filters has a passband bandwidth selected such that the net bandwidth of the receiver is set in accordance with Carson's Rule based upon the FM frequency deviation of said transmitter.

8. A system for use with an audio source for supplying audio signals at an output jack, said output jack having at least first and second terminals, said audio source having a signal ground conductor coupled to said first terminal, said audio signals coupled to said second terminal, comprising:

an RF transmitter having an RF output at which said RF transmitter supplies as an output a modulated RF carrier and having an audio plug sized to mate with said output jack, said RF transmitter having a signal ground conductor and having an audio input, said audio plug having a first terminal which makes electrical contact with said first terminal of said output jack when said audio plug is mated with said output jack, said first terminal of said audio plug coupled to said RF output, said audio plug having a second terminal coupled to the audio input, and said second terminal of said audio plug making electrical contact with said second terminal of said output jack when said output jack and said audio plug are mated:

a dipole antenna comprising said signal ground conductor of said audio source as one element of said dipole and said signal ground conductor of said RF transmitter as another element of said dipole antenna, said dipole antenna having a complex impedance which has a real component and an imaginary component:

and further comprising isolation means coupled between said first terminal of said audio plug of said RF transmitter and said signal ground conductor of said RF transmitter for electrically isolating the signal ground conductors of said RF transmitter and said audio source from each other at the frequency of said RF carrier but for electrically coupling said signal ground conductors of said RF transmitter and said audio source via a low impedance path at audio frequencies, and for cancelling at least part of said reactive component of said antenna impedance so as to transform the impedance of said dipole antenna closer to a purely real impedance with a smaller reactive component;

and further comprising impedance transformation means coupled to said RF output for transforming said impedance of said dipole antenna, as modified by said isolation means, to an impedance which is a closer match to the complex conjugate of the output impedance of said RF transmitter at said RF output, and wherein said impedance transformation means is an autotransformer having one coil with a tap along said coil coupled to said RF output of said RF transmitter and having one end of said coil coupled to signal ground conductor of said RF transmitter and having the other end of said coil coupled to said dipole antenna.

9. A portable RF transmitter unit for use with a portable audio unit including an audio circuit having a ground conductor and outputting a stereo audio signal comprising left and right channel signals and an output jack having first, second and third terminals connected to said ground conductor and said left and right channel audio signals, respectively, of the audio unit, the RF transmitter unit comprising:

an input plug having first, second and third terminals, the input plug being sized to mate with the output jack of the audio unit such that first, second and third terminals of the output jack contact the first, second and third terminals, respectively, of the input plug, respectively, when the input plug and output jack are mated; and an RF stereo transmitter having left and right channel audio input terminals and first and second RF output terminals, the left and right channel audio input terminals of the RF transmitter being connected to the second and third terminals of said input plug through second and third coils of a three coil common mode RF choke for receiving the left and right channel audio signals when the input plug and output jack are mated, the first RF output terminal of said transmitter being connected to said first terminal of the input plug such that when the input plug and output jack are mated the ground conductor of the audio unit acts as one radiating element of an antenna, the second RF output terminal being connected to a ground conductor of the RF transmitter, said ground conductor of said RF transmitter being coupled to said first terminal of said input plug through said first coil of said three coil common mode RF choke, said first, second and third coils of said common mode RF choke having identical high impedances at the frequency of said transmitter and having identical low impedances at audio frequencies, said ground conductor of said RF transmitter acting as the other radiating element of the antenna.

10. The RF transmitter unit according to claim 9 further comprising a battery coupled to said ground conductor, wherein the ground conductor of the RF transmitter further comprises conductive circuit components of the RF transmitter such as the battery.

11. The apparatus of claim 9 further comprising an autotransformer coupling said first RF output terminal of said RF transmitter to said ground conductor of said audio unit through said input plug and said output jack, for providing a closer impedance match between the output impedance of said RF transmitter and the input impedance of said antenna, said autotransformer having one coil with a tap along said coil, said tap coupled to said first RF output terminal of said RF transmitter and having one end of said coil coupled to said ground conductor of said RF transmitter and having the other end of said coil coupled to said ground conductor of said audio unit.

12. The RF transmitter unit according to claim 9, further comprising a step down transformer connected between the first RF output terminal and the ground terminal of the input plug to more closely match the output impedance of the RF transmitter with the impedance of the antenna.

13. A portable DC powered RF transmitter unit for use with an audio unit including an audio circuit which supplies as an output an audio signal and including an output jack having an audio output terminal for receiving the audio output signal and a ground terminal connected to a ground trace of the audio unit, the RF transmitter unit comprising:

a housing made of any material including metal;

an input plug having an audio input terminal and a ground terminal, the input plug being sized to mate with the output jack of the audio unit such that the audio output and ground terminals of the output jack contact the audio input and ground terminals of the input plug, respectively, when the input plug and output jack are mated;

an RF transmitter having an input terminal and first and second RF output terminals and having a ground trace, the input terminal of the RF transmitter being connected to the audio input terminal of the input plug when the input plug and output jack are mated, said connection being via a frequency deviation control network comprised of a voltage divider which divides the voltage of the audio signal down to a lower voltage and presents the reduced voltage audio signal at a node and a preemphasis circuit comprising a resistor and capacitor in parallel coupled to said node and functioning to limit excursions of said audio signal such that said input terminal of said RF transmitter receives an audio signal which has been suitably conditioned to limit the resulting deviation of the FM signal generated by said RF transmitter to the standard 75 kHz peak deviation used by FM broadcast receivers so as to prevent distortion of the transmitted audio in a standard broadcast band FM receiver, the first RF output terminal of said transmitter being connected to the ground terminal of said input plug such that when said input plug and output jack are mated, the ground trace of the audio unit acts as one radiating element of an antenna, the second RF output terminal being connected to ground trace of the RF transmitter unit, the ground trace of the RF transmitter acting as the other radiating elements of the antenna; and an RF choke connected so as to isolate the two radiating elements of the antenna from each other at the transmitting frequency of the RF transmitter but to act as a low impedance path between the ground traces at audio frequencies.

14. The RF transmitter unit according to claim 13 wherein said RF transmitter is an FM stereo transmitter and wherein said audio unit generates a stereo audio signal having left and right channel audio signals, and wherein said input plug and output jack include terminals to transfer both the right channel and left channel audio signals to right and left audio inputs of said RF transmitter, respectively, each audio signal being coupled from said input plug to an audio input of said RF transmitter through a deviation control network having the structure defined in claim 13.

15. The RF transmitter unit according to claim 14 further comprising an autotransformer coupling said first RF output terminal of said RF transmitter to said ground trace of said audio unit through said input plug and said output jack, for providing a closer impedance match between the output impedance of said RF transmitter and the input impedance of said antenna, said autotransformer having one coil with a tap along said coil, said tap coupled to said first RF output terminal of said RF transmitter and having one end of said coil coupled to said ground trace of said RF transmitter and having the other end of said coil coupled to said ground trace of said audio unit.

16. The RF transmitter unit according to claim 13, further comprising a step down transformer coupling said first RF output terminal and said ground trace of said audio unit through the ground terminal of the input plug and the appropriate terminal of said output jack on said audio unit to more closely match the output impedance of the RF transmitter with the input impedance of the antenna having as its radiating elements the ground traces of said audio unit and said RF transmitter.

17. A portable RF transmitter, comprising:

a portable battery operated audio source having an output jack and having a signal ground conductor coupled to a first terminal of said output jack, said audio source having right and left stereo audio channels which output signals and which are coupled to second and third terminals of said output jack;

a portable, battery operated RF transmitter positioned within a housing from which extends an audio plug sized to mate with said output jack and having first, second and third terminals which electrically connect to said first, second and third terminals, respectively, of said output jack when said audio plug is inserted into said output jack, said transmitter having a signal ground conductor coupled via a radio frequency choke to said signal ground conductor of said audio source through said first terminals of said output jack and said audio plug when said output jack and audio plug are mated, said radio frequency choke having a high impedance at approximately 100 MHz but approximately zero impedance at audio frequencies, said transmitter having an RF output comprising an RF ground output terminal coupled to said signal ground conductor of said transmitter and an RF output terminal coupled to said first terminal of said audio plug so as to be connected to said signal ground conductor of said audio source when said output jack and audio plug are mated, whereby said signal ground conductor of said RF transmitter and said signal ground conductor of said audio source act as dipole antenna elements of a radiating antenna and further comprising a broadband stepdown impedance matching transformer having a single winding with centertap and operating as an autotransformer, said centertap coupled through a D.C. blocking capacitor to said RF output, and wherein one end of said single winding is coupled to the signal ground conductor of said RF transmitter and the other end of said single winding is coupled through said audio plug and said output jack to the signal ground conductor of said audio source and wherein the number of turns from said centertap of said transformer single winding to the end of said winding coupled to said signal ground conductor of said RF transmitter is approximately half the number of turns from said end of said winding coupled to said signal ground of said audio source to said end coupled to said signal ground conductor of said RF transformer.

18. A portable RF transmitter, comprising:

a portable battery operated audio source having an output jack and having a signal ground conductor coupled to a first terminal of said output jack, said audio source having right and left stereo audio channels which output signals and which are coupled to second and third terminals of said output jack:

a portable, battery operated RF transmitter positioned within a housing from which extends an audio plug sized to mate with said output jack and having first, second and third terminals which electrically connect to said first, second and third terminals, respectively, of said output jack when said audio plug is inserted into said output jack, said transmitter having a signal ground conductor coupled via a radio frequency choke to said signal ground conductor of said audio source through said first terminals of said output jack and said audio plug when said output jack and audio plug are mated, said radio frequency choke having a high impedance at approximately 100 MHz but approximately zero impedance at audio frequencies, said transmitter having an RF output comprising an RF ground output terminal coupled to said signal ground conductor of said transmitter and an RF output terminal coupled to said first terminal of said audio plug so as to be connected to said signal ground conductor of said audio source when said output jack and audio plug are mated, whereby said signal ground conductor of said RF transmetter and said signal ground conductor of said audio source act as dipole elements of a radiating antenna and further comprising a broadband stepdown impedance matching autotransformer having a single winding with a centertap, said centertap coupled to said RF output, and wherein one end of said single winding is coupled to the signal ground conductor of said RF transmitter through a D.C. blocking capacitor having a low impedance at the transmit frequency of said RF transmitter the same said end of said single winding also coupled to a source of D.C. voltage, and wherein the other end of said single winding is coupled through said audio plug and said output jack to the signal ground conductor of said audio source through a D.C. blocking capacitor.

19. A portable RF transmitter, comprising:

a portable battery operated audio source having an output jack and having a signal ground conductor coupled to a first terminal of said output jack, said audio source having right and left stereo audio channels which output signals and which are coupled to second and third terminals of said output jack:

a portable, battery operated RF transmitter positioned within a housing from which extends an audio plug sized to mate with said output jack and having first, second and third terminals which electrically connect to said first, second and third terminals, respectively, of said output jack when said audio plug is inserted into said output jack, said transmitter having a signal ground conductor coupled via a radio frequency choke to said signal ground conductor of said audio source through said first terminals of said output jack and said audio plug when said output jack and audio plug are mated, said radio frequency choke having a high impedance at approximately 100 MHz but approximately zero impedance at audio frequencies, said transmitter having an RF output comprising an RF ground output terminal coupled to said signal around conductor of said transmitter and an RF output terminal coupled to said first terminal of said audio plug so as to be connected to said signal ground conductor of said audio source when said output jack and audio plug are mated, whereby said signal ground conductor of said RF transmitter and said signal ground conductor said audio source act as dipole antenna elements of a radiating antenna and further comprising:

a broadband stepdown impedance matching transformer having primary and secondary windings, one end of said primary winding coupled to said RF output, and the other end of said primary winding coupled to the signal ground conductor of said RF transmitter through a D.C. blocking capacitor having a low impedance at the transmit frequency of said RF transmitter, the end of said primary winding coupled to said RF transmitter signal ground conductor also coupled to a source of D.C. voltage, and wherein one end of said secondary winding is coupled through said audio plug and said output jack to the signal ground conductor of said audio source and the other end of said secondary winding coupled to the signal ground conductor of said RF transmitter.

* * * * *